Oct. 20, 1936. F. H. POOR Re. 20,140
POWER UNIT
Original Filed Dec. 19, 1928 2 Sheets-Sheet 1
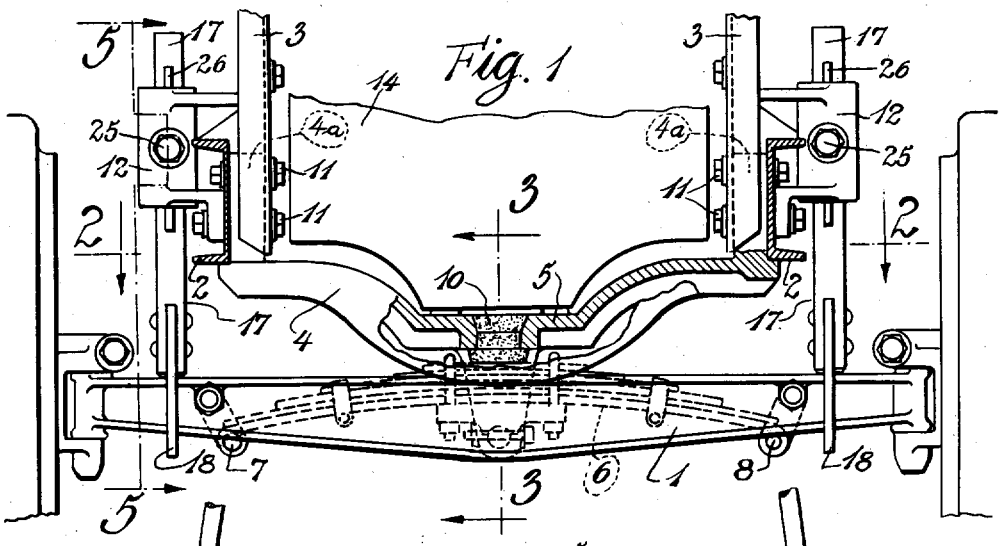
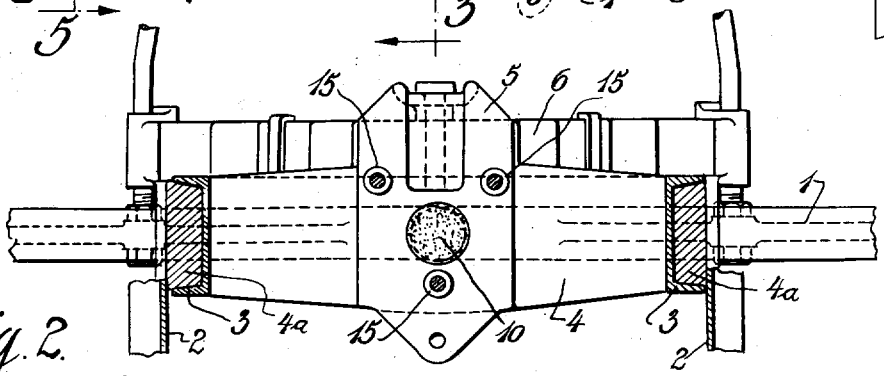
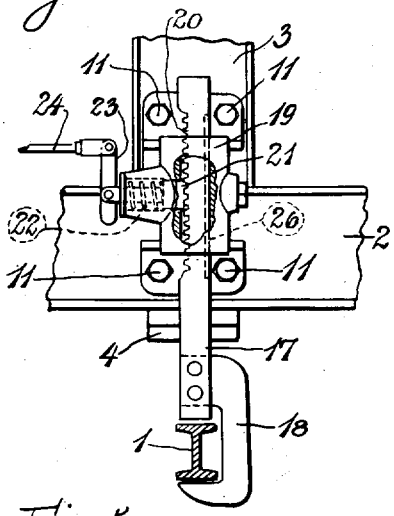
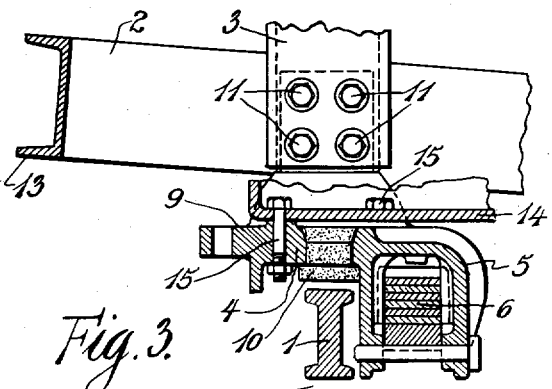
Frederick H. Poor,
INVENTOR.
BY Roger Sherman Hoar
ATTORNEY.

Oct. 20, 1936. F. H. POOR Re. 20,140

POWER UNIT

Original Filed Dec. 19, 1928 2 Sheets-Sheet 2

Frederick H. Poor,
INVENTOR.

BY Roger Sherman Hoar
ATTORNEY.

Reissued Oct. 20, 1936 Re. 20,140

UNITED STATES PATENT OFFICE 20,140

POWER UNIT

Frederic H. Poor, deceased, late of Yonkers, N. Y., by Bucyrus-Erie Company, assignee, South Milwaukee, Wis., a corporation of Delaware Original No. 1,911,465, dated May 30, 1933, Serial No. 326,930, December 19, 1928. Application for reissue May 29, 1935, Serial No. 23,973

8 Claims. (Cl. 180—64)

The present invention relates to mobile power units and more particularly is directed to tractors which may be equipped with a crane or other hoisting machinery, one of the objects of the invention being an improved machine of the character indicated wherein the mounting of the crane frame as well as the engine frame on the axles of the unit has been improved as compared with existing power units of the same general type, the improved mounting of this invention being of such a character that the usual tractor, i. e., a power unit equipped with its own propulsion mechanism may be readily converted into a hoisting machine for example, it being understood of course that after being so changed over the machine is still capable of use as a tractor for the purpose of drawing a trailer or other apparatus from one point to another.

In the drawings accompanying this application,

Fig. 1 shows an embodiment of the present invention in front elevation and partly in section;

Fig. 2 is a section on the line 2—2 of Fig. 1; and

Figure 4:
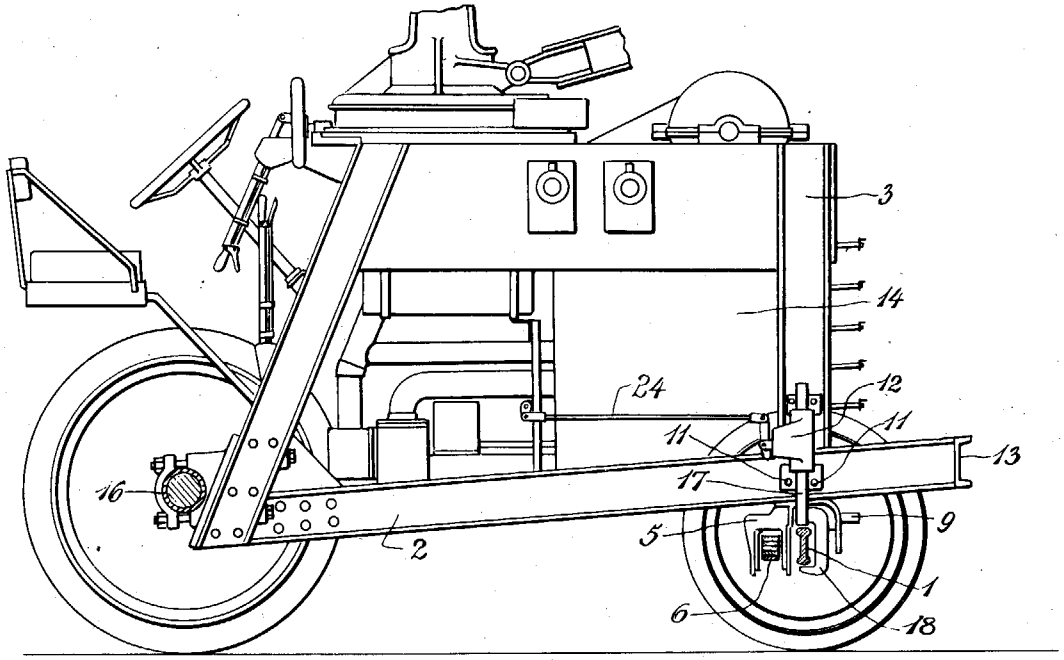

Fig. 3 a section on the line 3—3 of Fig. 1.

Fig. 4 is a side elevation of my invention showing both axles of the mobile power unit of my invention, with the associated parts of my crane-frame.

Fig. 5 is an enlarged detailed side elevation partly in section of the stabilizer 12 of Figure 4.

Referring to the drawings in detail, the present invention provides a machine to be termed throughout this description and throughout the appended claims as a tractor crane, including a traction base embodying front and rear axles, a crane frame supported thereon in a manner to be hereinafter referred to in detail, and an engine and engine frame.

The crane frame will comprise, for instance, a hoisting crane with the necessary apparatus for operating the same. Inasmuch as the construction of the crane and of the propulsion mechanism, etc. forms no part of the present invention the same will not be described in detail herein.

In the specification and claims, the terms "tractor crane" and "crane frame" will be employed illustratively, rather than restrictively, and shall be taken to cover broadly any similar auxiliary equipment, other than cranes strictly speaking. As is obvious from an inspection of Fig. 1, the word "axle", as applied to my invention does not mean a transverse member the ends of which are machined to serve as bearings for wheels, but rather means any transverse load-supporting member, the ends of which are adapted to be supported by traction elements. It is in this broader sense that the word "axle" will be used throughout the specification and claims.

The front axle of the traction base is shown at 1. Above the axle is the crane frame of the machine, this frame comprising the side members 2—2 running from the front of the machine rearwardly to or adjacent the rear axle 16 to which they are attached. Within the space defined by the side members 2—2 of the crane frame are crane frame members 3—3 which may be, for instance, in the form of channels extending vertically as shown in Figs. 1 and 4.

The mounting of the crane frame, and the mounting of the engine frame, both considered with respect to the axle 1, are the prime features of the present invention.

An inspection of Fig. 1 will show that 4 designates a bolster extending transversely of the traction base, and provided with a rearwardly extending bifurcated portion 5 straddling the leaf spring 6, this spring also extending transversely of the machine and being attached by suitable links at the ends of the spring to the axle as shown at 7 and 8.

The extension 5 of the bolster and the spring 6 are both at the rear of the axle 1. The bolster also has a forwardly extending portion 9 overlying the axle 1 as shown in Fig. 3 and extending a short distance in front thereof. That portion of the bolster immediately overlying the axle is provided with a buffer 10 of rubber, for example.

The bolster extends laterally as viewed in Fig. 1 from that portion which straddles the spring to and beneath the side frames 2 of the crane frame to engage and support the same.

The side members 3 of the crane frame are rigidly secured to the members 2 as by bolts 11. The members 2 are joined together by the cross-member 13, as shown in Figure 3, this cross-member serving not only to stiffen the crane frame laterally, but also to serve as a front bumper.

Engine frame 14 is secured to the bolster 4 by three centrally located bolts 15, which are spaced so closely together as to constitute practically a single point of support. Thus both the crane frame and the engine frame are supported on the bolster 4 which as above explained finds its support on the spring 6. As above pointed out the side members 2 of the crane frame of the machine extend rearwardly to the rear axle 16 to be supported thereby in any suitable fashion, and since the engine frame is supported at the rear in the conventional manner on the rear axle, and in the front on the same bolster that supports the crane frame, and since the frames are rigidly secured to each other and the whole structure is supported by the spring 6 and the rear axle, the spring 6 being attached at each end to the front axle, it will be seen that the engine frame is dependent of the main frame and has a three point mounting, one at the front and two at the rear, while the crane frame has a four point mounting, two at the front and two at the rear.

The structures shown at 12, at each side of the machine, are stabilizing devices, but inasmuch as these devices constitute the subject matter of a co-pending Patent No. 1,975,119, issued Oct. 2, 1934, to the assignee of the present applicant, the same will not be referred to in any very great detail.

However, as these stabilizers in their broad scope constitute one of the elements of the combination to be claimed herein, the following will be said of them.

Turning to Figures 1 and 4, as amplified by Figure 5, we see that each stabilizer comprises a vertically movable plunger 17 interposed between the load (i. e., the crane-frame 2 and 3, etc.) and the axle 1. This plunger immediately overlies the axle 1, and may be secured thereto in any convenient manner, as by hook 18. Normally, the plunger is free to reciprocate in bracket 19, which is secured to crane-frame members 2 and 3 and to the upwardly extending end 4a of bolster 4 by bolts 11. But the plunger is toothed as at 20, and the bracket 19 carries a horizontally reciprocable pawl 21, to engage these teeth. This pawl may be actuated in any convenient manner as by spring 22, lever 23, and rod 24. Bolt 25 runs in a guide 26, to keep the plunger 17 from turning.

From this brief description it is evident that, although my crane is normally supported at three points (namely, the two rear axles 16; and, through its dependence on the engine, the center of the bolster 4); yet, by locking the stabilizers, my crane is supportable at two front points (namely, at the ends of the bolster 4, by the two stabilizers), and hence thus has the optional four-point mounting, which I am claiming as one of the principal features of my invention.

It is evident that various modifications may be made in the construction above described within the purview of this invention.

What is claimed is:—

1. In a tractor crane, the combination of: a traction base, including front and rear axles, a spring supported adjacent its ends by the front axle, and a bolster supported adjacent its center by the spring, and at will at two widely separated points by the front axle; a crane frame, supported at two widely separated points on said bolster; and an engine frame, supported on said bolster adjacent the center of said bolster; said two frames being mounted dependently of each other.

2. In a tractor crane, the combination of: a traction base; a crane frame; an engine frame, rigid with the crane frame; a bolster underlying said frames, and to which they are directly attached; and a spring engaged by said bolster.

3. In a tractor crane, the combination of: a transversely extending bolster; a transversely extending spring; a connection between the bolster and the spring, intermediate the ends of both bolster and spring; a crane frame resting on the ends of said bolster; and an engine frame rigidly secured to said crane frame.

4. In a tractor crane, the combination of: a transversely extending bolster; a transversely extending spring; an axle to which the extremities of the spring are attached; means for attaching the bolster to the spring at a point intermediate the ends of both; a crane frame supported on the extremities of the bolster; and an engine frame rigidly secured to said main frame.

5. In a tractor crane, the combination of: a crane frame; an engine frame lying within the sides of said crane rigidly secured thereto; a bolster extending transversely of the tractor crane, and having its extremities engaging said crane frame; a front axle; a spring to the rear of said front axle, extending transversely of the tractor crane, and having its ends secured to said axle; a bifurcated projection on the bolster, extending rearwardly to straddle the spring at the rear of the axle; and means for attaching the bifurcated projection of the bolster to the spring.

6. In a tractor crane, the combination of: a traction base; a crane frame, supported at two widely separated points adjacent one end of said base, and supportable at two widely separated points adjacent the other end of said base; and an engine frame, supported at two widely separated points adjacent one end of said base, and supported adjacent the center of the other end of said base; said two frames being mounted dependently of each other.

7. The combination with a vehicle including ground-engaging means and a main frame resiliently supported thereon, of an auxiliary frame, means for detachably mounting said auxiliary frame on said main frame, and means for optionally providing a rigid weight supporting connection from said auxiliary frame to said ground-engaging means.

8. In a vehicle, a main frame ground-engaging members, means mounting said ground-engaging members for bodily movement relative to said main frame, an auxiliary hoisting mechanism frame, detachable means securing said auxiliary frame to said main frame, brackets rigidly secured to said auxiliary frame for detachment therewith, and means for establishing a rigid connection between said ground-engaging members and said brackets to support said hoisting mechanism frame by said ground-engaging members when the hoist is in operation.

BUCYRUS-ERIE COMPANY,
*Assignee of Frederic H. Poor, Deceased,*
By G. A. MORISON,
*Its Vice President.*